Jan. 21, 1969  J. J. ELENGO, JR  3,422,671
LOAD CELL
Filed May 4, 1966  Sheet 1 of 4
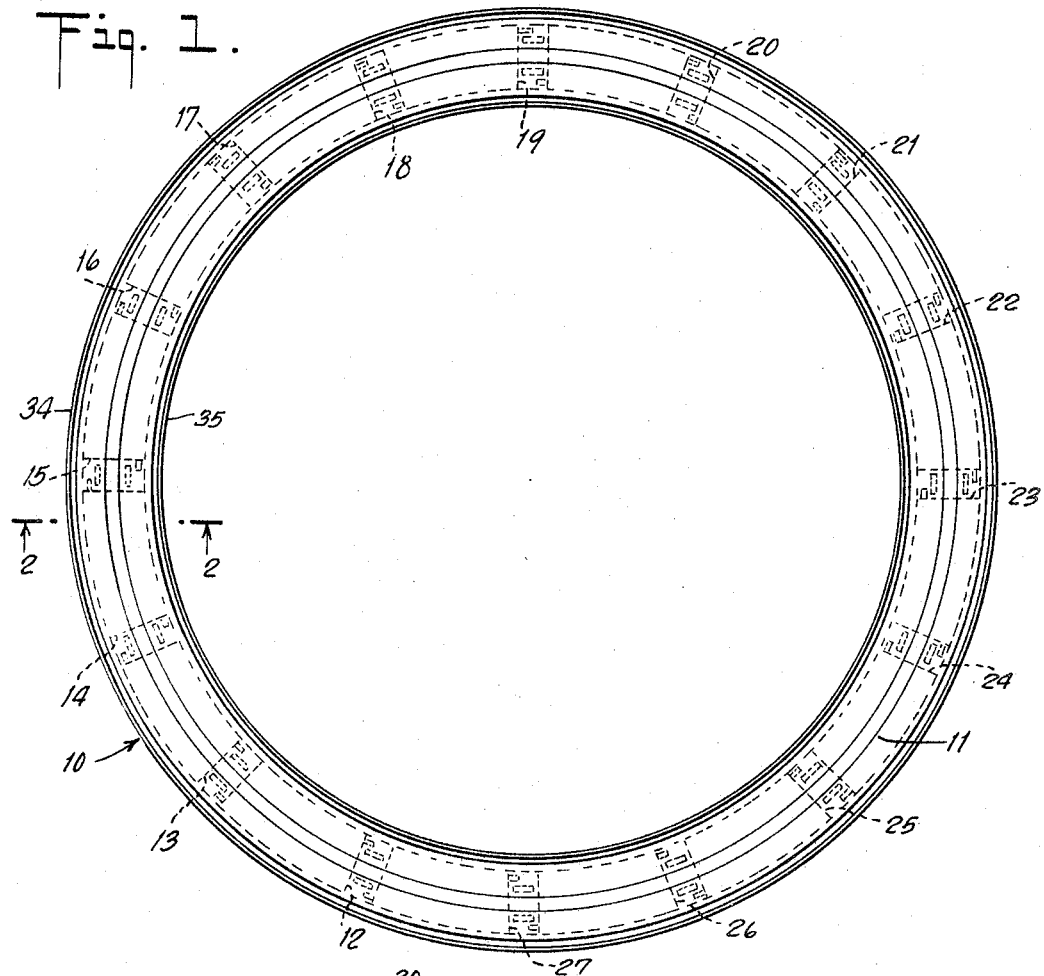
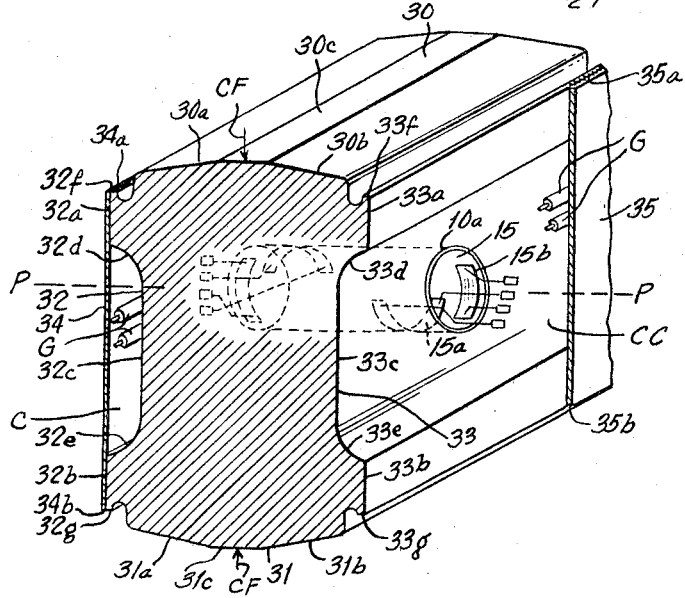
INVENTOR
JOHN J. ELENGO, JR.
BY Lester W. Clark
ATTORNEY

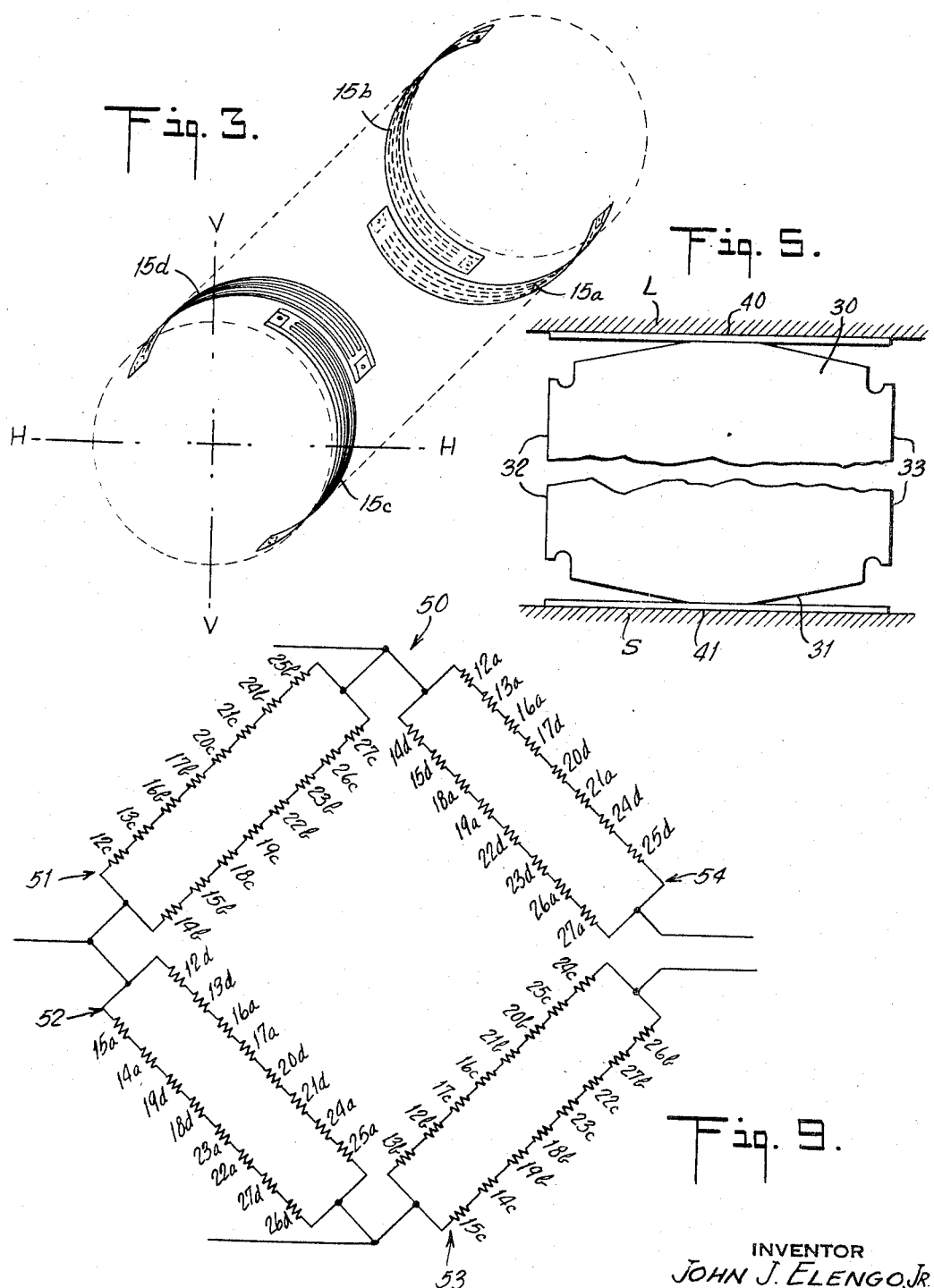

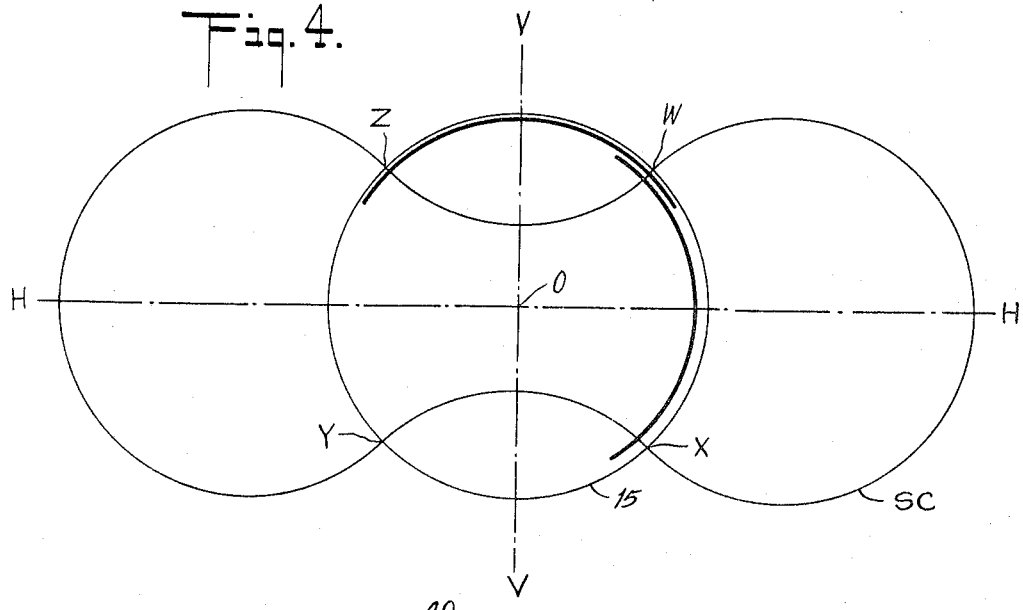
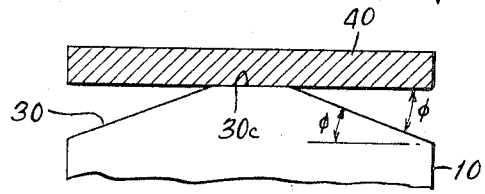
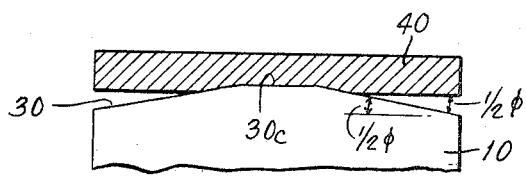
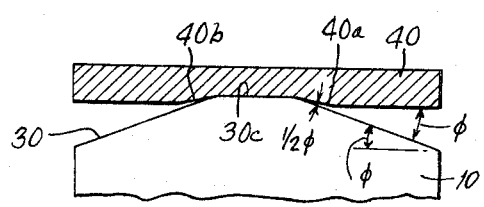

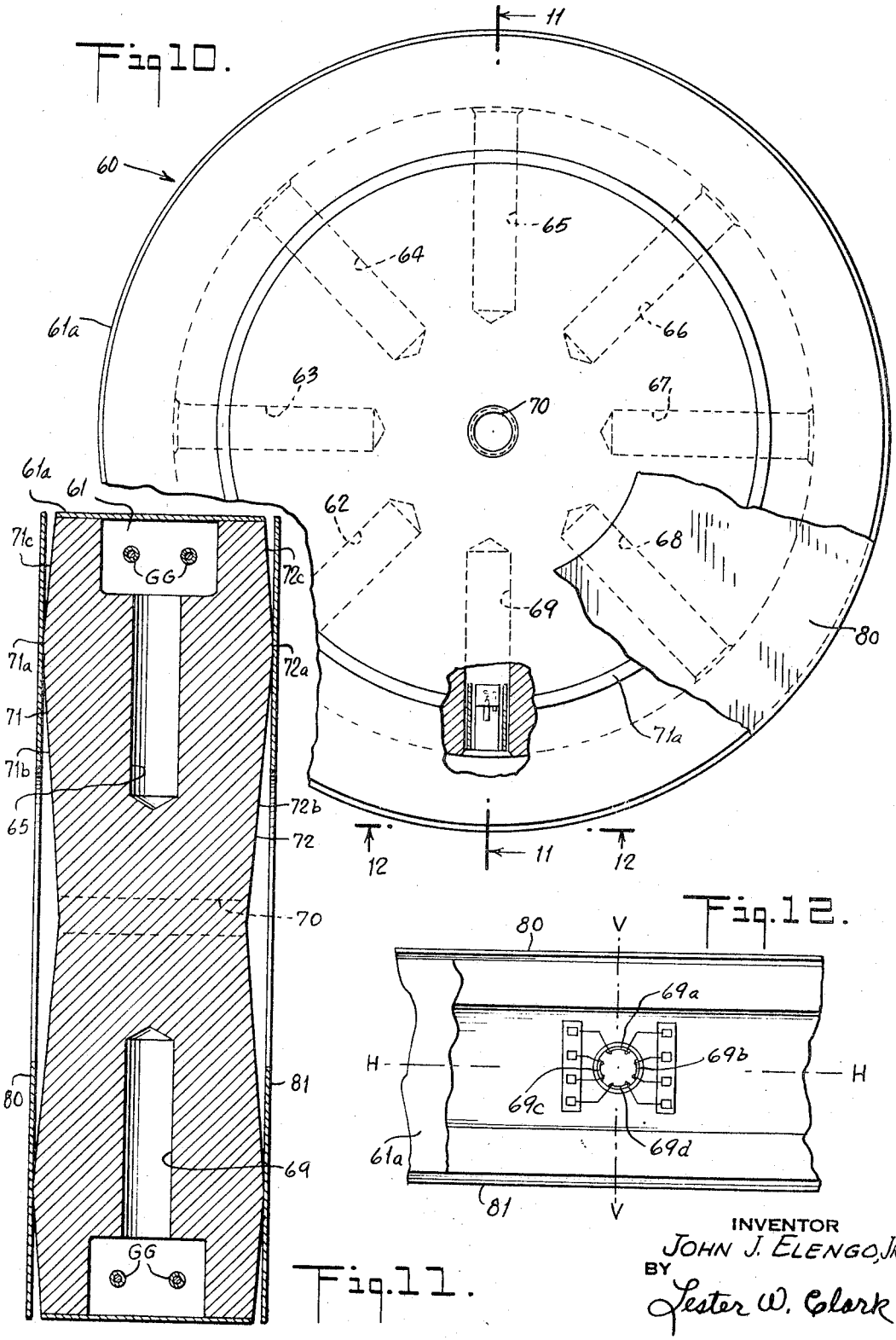

2

3,422,671
LOAD CELL
John J. Elengo, Jr., Hamden, Conn., assignor to Revere Corporation of America, Wallingford, Conn., a corporation of New Jersey
Filed May 4, 1966, Ser. No. 547,623
U.S. Cl. 73—141             21 Claims
Int. Cl. G01l 5/00

ABSTRACT OF THE DISCLOSURE

Load cell for measuring high intensity loads, e.g., for steel rolling mills, comprising a body having a relatively short dimension in the direction in which the loads are applied and a relatively long dimension transverse to that direction. The body may be an annulus or a disc. It is provided with a plurality of apertures whose axes lie in a plane parallel to the end loading surfaces of the body. Resistance type strain gages are bonded to the interior of at least some of the apertures.

Each load bearing end of the body is provided with a loading surface including an elongated plane portion at rgiht angles to the axis of the body and two elongated sloping portions tapering from the plane portion on each of its long sides. Malleable load transferring and distributing members (e.g., sheets of copper) are placed between the loading surfaces of the body and the load applying surfaces between which it is placed. These members cooperate with the sloping portions of the loading surface to transfer an increasing proportion of the load to those sloping portions as the load increases, so that the total load carrying area increases with increasing load.

---

This invention relates to load cells, and more particularly relates to compression load cells adapted to measure very high intensity loads by converting the compressive load force on the cell into strain and measuring the strain.

By very high intensity loads is meant loads measured in the millions of pounds, and including loads approaching one million pounds. Examples of instances in which loads of that magnitude must be measured, include cold rolling strip mill operations in steel mills and static testing of large rocket engines. The forces exerted on the rolls of a cold rolling strip mill are ordinarily referred to as the "screw down pressures," and frequently reach five million pounds and more. The forces exerted by a captive rocket engine in a static test also reaches millions of pounds. In the steel mill instance these extremely high forces must be measured with great accuracy so that the gage tolerance on the rolled steel can be closely held. In the case of static testing of large rockets, it is essential that the thrust force produced by the rocket be accurately measured as a function of time, and when rockets are clustered it is essential that the relative thrust produced by each of the individual rockets be very accurately monitored, so that precise flight characteristics can be predicted. In these and other instances, very high loads must be measured with a high degree of accuracy.

It is an object of the invention to provide a load cell capable of accurately measuring very high in tensity compressive load forces.

Another object of the invention is to provide such a load cell wherein unevenly applied loads do not affect the accuracy of measurement.

Another object of the invention is to provide a load cell including an arrangement of strain gages adapted to provide an improved measurement of the force on the load cell as represented by strain at the strain gages.

Another object of the invention is to provide a load cell having a low profile, i.e. having a width very much greater than the height of the cell.

These and other objects and advantages of the invention will be more fully understood as various presently preferred but merely illustrative embodiments thereof are described hereinbelow, in connection with the appended drawings, in which:

FIG. 1 is a plan view of a first embodiment of a load cell according to the invention;

FIG. 2 is a section view of a portion of the load cell shown in FIG. 1 and viewed along plane 2—2 therein;

FIG. 3 is an enlarged detail view of a stress concentrator aperture of the load cell shown in FIG. 2 showing details of gage location;

FIG. 4 is a diagrammatic view showing the aperture of FIG. 3 in end view with a stress concentration diagram superimposed thereon;

FIG. 5 is a partial section view similar to that of FIG. 2 showing load distributing and transferring members carried on the loading surfaces;

FIGS. 6, 7, and 8 are diagrammatic views of a portion of the apparatus shown in FIG. 5, with the proportions exaggerated for purposes of illustration, the sequence of views illustrating a loading-unloading cycle;

FIG. 9 is an electrical schematic diagram of a circuit for measuring the composite stress produced in the load cell of FIG. 1 as reflected in the various individual strain gages associated therewith;

FIG. 10 is a plan view of a second embodiment of a load cell according to the invention having a portion thereof broken away to show certain internal details;

FIG. 11 is a section view of the load cell shown in FIG. 10 viewed along plane 11—11 therein; and FIG. 12 is a partial detail view of the load cell shown in FIG. 10 and viewed along plane 12—12 therein.

Referring now to the figures, and particularly to FIGS. 1–5, there is shown, indicated generally at 10, a first embodiment of a load cell according to the invention. Load cell 10 comprises an annular body 11 having a plurality of equispaced radial apertures 12–27 therein. These apertures 12–27 are stress concentrator apertures, as will appear hereinafter. While sixteen equispaced radial apertures 12–27 are shown, this number may be varied upwardly or downwardly depending upon the characteristics of employment of the apparatus. In general, the greater the number of apertures, the greater the stress concentration. It is not necessary to gage all the apertures.

As may best be seen in FIGS. 1 and 2, the proportions of the cell 10 are such that the overall width of the cell, i.e. the diameter of the cell, is many times the overall height thereof, and the cross-section of the annular body 11 is generally rectangular, with the overall height and width of the cross-section being approximately equal. In practice the cross-sectional configuration of the annular body 11 may vary considerably from the genearlly rectangular embodiment illustrated, and may also have essentially circular or other outlines, provided the loading surfaces are arranged as described hereinafter. However, since loading forces are applied in the directions indicated by the arrows CF in FIG. 2, it is preferred that the generally rectangular cross-sectional configuration of the annular body 11 be employed.

The load cell 10 includes an annular upper loading surface 30 and an annular lower loading surface 31. Each of surfaces 30, 31 is beveled away from a central flat to form continuously sloping regions, i.e. upper surface 30 includes a pair of inclined preferably conical surfaces 30a, 30b which extend downwardly on either side of a central upper flat 30c. Similarly, lower loading surface 31 includes a pair of inclined preferably conical surfaces 31a, 31b extending upwardly on either side of a central flat 31c. The upper flat 30c constitutes a summit region, and the lower flat 31c constitutes a foot region, for their respective surfaces 30, 31 and for load cell 10. The angle of bevel of surfaces 30a, 30b and 31a, 31b is such that the surfaces 30, 31 describe very shallow arches, e.g. less than 2° inclination from the horizontal. The purpose of these beveled arches is to initially center the load, and to gradually spread the load to a greater, but still centered, area as the load progressively increases. The load cell 10 compresses slightly under such loading, thereby driving the flats 30c, 31c closer together, and this causes the loading surfaces 30, 31 to be rendered progressively shallower, thus, together with load transferring and distributing means to be presently described, spreading the greater loading to a greater area including initially part and eventually all or nearly all of the inclined surfaces 30a, 30b and 31a, 31b as the angle of inclination from the horizontal approaches 0°. This compression under loading occurs within the elastic limit of the material of load cell 10, so that the loading surfaces 30, 31 recover their original configuration upon unloading.

The radially outward vertical surface 32 and the radially inward vertical surface 33 of load cell 10 are preferably indented in the illustrated manner, to provide, with mating cover plates, inner and outer channels for the accommodation of cables, as presently described. Specifically, surface 32 comprises co-planar upper and lower vertical surfaces 32a, 32b, and an intermediate vertical surface 32c spaced inwardly of the plane of surfaces 32a, 32b. Surface 32c meets surfaces 32a, 32b at rounded fillet surfaces 32d, 32e respectively. Radially inward vertical surface 33 is essentially a mirror image of surface 32, and includes surfaces 32a–33e corresponding to the surfaces just described with respect to radially outward vertical surface 32. Upper surfaces 32a, 33a terminate at vertically upward extending lips 32f, 33f and lower surfaces 32b, 33b terminate at vertically downward extending lips 32g, 33g. A cylindrical plate 34, having a cylindrical diameter equal to that of upper and lower outer surfaces 32a, 32b, is secured thereto by welding at 34a, 34b respectively. Plate 34 and surface 32 define an outward annular channel C, in which are accommodated cables G which include all the leads from some of the gages of the cell, to be described presently. Similarly, a cylindrical plate 35 is welded at 35a, 35b to lips 33f, 33g, and defines an inner annular channel CC accommodating further cables G including leads from the remainder of the cell gages.

Radial aperture 15 is shown in FIG. 2, and is representative of each of the aforesaid radial apertures 12–27. Radial aperture 15 extends from radially inward vertical surface 33 through to radially outward vertical surface 32, and the longitudinal axis of aperture 15 lies approximately in a median plane P—P dividing load cell 10 into upper and lower symmetrical halves. Radial aperture 15 may have any configuration, provided that an appropriate number of peripheral portions are provided for mounting strain gages, as will be presently described. The illustrated circular-cylindrical outline is preferred. Chamfers 10a are provided at the intersection of aperture 15 with surfaces 33, 32.

Each of radial apertures 12–27 is relatively small in cross-section compared to the surrounding stock of load cell 10. As will be understood by those skilled in the art, such apertures act as stress concentrators, and the material above and below the apertures do not act as beams. In all standard texts, and in the practice of the art, small apertures, even infinitesimal apertures, are recognized as stress concentrators, and are analyzed under the "stress concentration" heading rather than under the "beam theory" heading. Larger apertures, e.g. where the aperture is a large fraction of, or nearly as large as, the surrounding stock, act as beams, and may be analyzed by beam theory. The mathematical models and methods of treatment are different, and further, with stress concentration apertures, experimental methods such as photoelasticity are often employed because of the complexity of stress concentration. The use of stress concentrator apertures as opposed to a structure employing beams, contributes to the ruggedness and sensitivity of the load cells according to the invention. The employment of stress concentrator apertures at separated points in the load cell 10 means that the material surrounding the apertures need not be reduced in any dimension. In beam apertures the material must be reduced to load the beam (i.e. the material over and/or under the aperture) at the center thereof, e.g. by necking-down the cell above and/or below a transverse beam aperture to a fraction of its full transverse cross-sectional area. Since stress concentrator apertures do not require any necking-down, an equivalent sized cell according to the present invention is more sensitive and has greater strength than a cell utilizing beam apertures.

As is best shown in FIGS. 2 and 3, in the illustrated cell 10 each radial aperture, such as radial aperture 15, has attached to its surface a plurality of strain gages. It is however, not necessary to include gages in every radial aperture. Rather, an optimum arrangement, from the combined standpoint of sensitivity and economy, is likely to require in a given embodiment of cell 10 that less than all of the apertures be gaged. As mentioned previously, the greater the number of stress concentrator apertures, the greater the stress concentration. Ungaged apertures thus have a function. In a given application it may be, for example, optimum to gage only about half, or some other fraction, of the apertures. Thus with sixteen apertures (as illustrated) it may be optimum to gage only eight for economy, and to nevertheless gain from the remaining eight apertures a measure of increased sensitivity.

In the illustrated embodiment of FIGS. 1–5, each aperture such as aperture 15 includes four strain gages. As will appear hereinafter, employment of four gages is preferred, but more or less gages may be employed in apertures 12–27. A pair of strain gages 15a, 15b is located within aperture 15 conveniently adjacent vertical surface 33, and a second pair of strain gages 15c, 15d is located within aperture 15, conveniently adjacent surface 32, although the location along the length of aperture 15 is not critical. Each of gages 15a–15d is secured, e.g., by bonding to the inner wall of aperture 15, in such an orientation that the longitudinal axis of the gage, i.e., the strain-sensitive axis, is disposed circumferentially against a portion of the cylindrical inner wall of aperture 15. It may be desirable in some cases to dispose the long axis of each gage in the direction of the longitudinal axis of the aperture. This reduces sensitivity, as the gage output then varies as a function of Poissons ratio, but it is nevertheless useful in some instances.

As is shown in FIG. 4, in response to loading along the V—V axis, a stress concentrator hole such as 15 developes a stress pattern which may be represented by the superimposed dumbbell-shaped curve SC. The four points W, X, Y and Z at which the curve SC crosses the wall of aperture 15 represent points of zero stress concentration. The minor portion of curve SC between points W and X thereon, and the minor portion between Y and Z thereon, each represent compression stresses whose value symmetrically increases from zero at any of the aforesaid points to a maximum at the H—H axis and then back to zero. Similarly, the minor curve portions Z to W, and X to Y, represent tension stresses, that increase negatively, i.e., that increase in the tension sense, symmetrically from any of the zero points to a maximum tension value at the V—V axis and then back to zero. Maximum sensitivity is attained when the maximum tension point (on axis V—V) of the aperture, and the maximum compression point (on axis H—H) of the aperture, is monitored by gages. A gage may be placed to monitor tension stress in one stress concentrator aperture, and another gage may be placed to measure compression stress in another aperture. Preferably however, both tension and compression stresses will be monitored in each aperture that is monitored at all. Also preferably, a pair of gages will measure tension at the upper and lower aperture tension positions (on axis V—V) and a pair of gages will measure compression at the right and left lateral aperture compression positions (on axis H—H). This preferred four gage arrangement is illustrated in FIGS. 1–4. The pair of gages $15a$–$15d$ is centered on the vertical axis V—V of aperture 15, and the pair of gages $15b$, $15c$ is centered on the horizontal axis H—H of aperture 15. The length of the gages will be controlled to average the stress monitored to a desired value. As illustrated, the gages may even be of such a length as to extend somewhat into an adjacent region of opposite stress sign. As long as the net value of stress monitored by a gage remains of the intended sign (e.g., tension or compression) this arrangement is satisfactory. While the maximum sensitivity occurs with point gages at the aperture positions intersected by V—V or H—H, in the practical cell the averaging contributed by the elongated gages is desirable to control sensitivity to any desired value.

The strain gages of each of apertures 12–27 are numbered according to the same system employed with reference to example aperture 15. That is to say, the strain gages of any of apertures 12–27 are numbered with the number corresponding to the number of that aperture followed by a suffix $a$, $b$, $c$, or $d$, indicating the four strain gages for that aperture, and further indicating, by the particular suffix, the position of that strain gage within that aperture as corresponding to the position illustrated in aperture 15 having the corresponding suffix. This system of numbering will be helpful presently when the manner of connecting the various strain gages to monitor the overall load on the load cell 10 is described. For purposes of electrical balance and sensitivity, it is preferred as aforesaid that the same number of gages be employed in each of apertures 12–27, and that this number be four gages per aperture so that each aperture may contribute to all four arms of a Wheatstone bridge circuit. However, also as aforesaid, multiple apertures each having less than four gages each, can be tied together electrically into a wheatstone bridge circuit to monitor tension and compression stresses. Finally, it is possible to monitor only tension stresses, or only compression stresses, although this is not preferred.

As is best shown in FIG. 5, a pair of load distributing and transferring members 40, 41 overlie and underlie respectively upper and lower loading surfaces 30, 31. Each of members 40, 41 is annular in configuration so as to respectively overlie and underlie load cell 10 throughout its annular expanse. The respective inside and outside diameters of each of members 40, 41 is substantially equal to the corresponding diameters of radially inward and outward vertical surfaces 33, 32 of load cell 10. The members 40, 41 are rigid enough to maintain their shape against deformation by relatively low forces, but are malleable enough to be deformed under relatively high forces. To achieve this, the members 40, 41 may be fabricated in a malleable material, which may be metallic or non-metallic, e.g., a malleable metal such as copper, or a malleable non-metal such as Teflon. Malleable metals are preferred, and copper is the most desired material because of its flow characteristics under pressure. The members 40, 41 may be fabricated from solid stock, as for example, from sheet stock, or may be fabricated from apertured stock, as for example, from heavy woven screen stock. The thickness of members 40, 41 is at least an appreciable fraction of the depth of the bevel-arched portions of loading surfaces 30, 31 with respect to their central flats $30c$, $31c$, for a purpose to be presently explained.

A load L is applied to the annular upper loading surface 30 through the intervening load distributing and transferring member 40, and this load is supported by a rigid support S exerting an equal upward force at lower loading surface 31 through the intervening load distributing and transferring member 41. The effect of the combination of the bevel-arched loading surfaces 30, 31 and the load distributing and transferring members 40, 41 is to confer loading characteristics on the load cell 10 which are highly conducive to maximum sensitivity and accuracy of the load cell at extremely high loadings. This results from the loading surface configuration, the already mentioned employment of stress concentrator apertures, and additionally from two distinct phenomena arising in the relationship between the load distributing and tranferring members 40, 41 and the loading surfaces 30, 31. These two phenomena will now be described.

First, the combination of the arched loading surfaces 30, 31 and the load distributing and transferring members 40, 41 provides evenly applied and centered initial loading upon the load cell annulus and progressive and evenly applied distribution of the loading to a greater but still centered annular area as the loading progressively increases. With reference to diagrammatic FIGS. 6 and 7, the mechanism by which a load transferring and distributing member such as 40 cooperates with the loading surface such as 30 to evenly and progressively apply increasing load will be pointed out. In FIG. 6 the member 40 is shown resting upon the flat $30c$ under conditions of no load. When loading is applied to cell 10 through the intervening member 40 it will initially be applied to central flat $30c$, and thereby will be applied centered on the annulus of load cell 10. As the load is increased the flat $30c$ is driven toward the opposed flat $31c$ (FIG. 5) thus decreasing the initial angle of inclination $\phi$. In the diagrammatic FIGS. 6 and 7, the loading is postulated as such as to have decreased the angle $\phi$ to the angle $\frac{1}{2}\phi$. Partly because of penetration of malleable member 40 by the upper loading surface 30, and partly because of the decrease in the angle of inclination $\phi$, the increased loading is accompanied by contact between a greater area of loading surface 30 and load distributing and transferring member 40. It will be noted that the loading which was initially centered remains centered as the loading is increased, and at the same time that the increasing area of support of the loading tends to keep the unit loading within safe values. At the same time, and importantly, any imperfections in the loading surface 30, such as low or high spots or the like, or any similar irregularities in the mating surface of load L, will not cause uneven stress concentrations to be reflected within the body of load cell 10. Rather, the load distributing and transferring member 40, being malleable, will flow into any low spots and accommodate any high spots so as to distribute the loading evenly across the loading surface 30 just as if the match between that surface and the load L were perfectly smooth.

Second, the combination of the load distributing and transferring members with the arched loading surfaces eliminates mechanical hysteresis originating in the phenomena known in the art as "hang-up." Normally, when a load is applied to a load cell the compression resulting in the load cell is accompanied by outward lateral expansion of the load cell and the load, but to differential amounts, since the load carrying member and support member are generally operated at lower stress levels, thereby eliminating need for hardened material and special heat treatment. This outward lateral expansion due to compression results from Poissons forces developed in the material. The surface contact friction forces which prevent the contacting load and load cell surfaces from expanding and contracting in exact correspondence laterally, i.e. that cause the differential expansion and contraction therebetween, are what is known in the art as the aforesaid "hang-up." To the extent that "hang-up" occurs, the reading registered for a given load will depend upon whether that given loading is attained in a loading direction or in an unloading direction. For example, the reading registered under an actual load of one million pounds will be different when the loading is increased from zero to one million pounds as opposed to when the loading is decreased from two million to one million pounds. "Hang-up" is a major component of the mechanical hysteresis accounting for the difference in such readings.

With reference to FIG. 8 it will now be explained how the present invention overcomes "hang-up." In FIG. 8 there is shown a load cell 10 which has previously been loaded to the degree already illustrated and described with respect to FIG. 7, and which now bears no load. It will be observed that the angle of inclination has been restored to $\phi$, but that the indentations 40a, 40b in member 40 remain approximately at the inclination $\frac{1}{2}\phi$ which they attained when the cell was previously loaded to the position shown in FIG. 7. What this means is that the process which occurs upon loading, wherein the portion of member 40 contacting the inclined surfaces of loading surface 30 were kept in contact therewith during the entire loading process, is not maintained during the unloading process. Rather, as soon as the cell begins to be unloaded, the indented portions 40a, 40b of member 40 break away from contact with the inclined surfaces of loading surface 30. This is so because the loading surface 30 becomes more arched upon unloading thus moving out of contact with indented surfaces 40a, 40b of member 40. This immediate break-away of the loading surface 30 prevents "hang-up," since there are no contacting friction surfaces to produce differential lateral contraction. Only the relatively small surface at flat 30c remains in contact with member 40 during unloading, and the malleability of member 40 plus the narrowness of flat 30c prevents the development of "hang-up" there.

For illustration, the combination of member 40 with loading surface 30 has been described above. It should be understood however, that the effect between member 41 and loading surface 31 is identical. The aforesaid attributes contributed by the combination of load distributing and transferring members 40, 41 together with loading surfaces 30, 31 provide an even, accurate, and predictable loading of load cell 10 in response to an applied load. Such characteristics are required if the stress concentrator apertures 12–27 are to accurately reflect the applied load. The combination of radially placed stress concentrator apertures together with the loading configuration, provides very accurate and balanced monitoring at the various already-described gages. The means by which the gages are monitored will now be described.

With reference to FIG. 9, the connections made among the various strain gages for purposes of monitoring the load supported by load cell 10 will now be described. In FIG. 9 there is shown a Wheatstone bridge circuit indicated generally at 50 which is employed to monitor the strain produced at all the strain gages in apertures 12–27. Bridge 50 includes the usual four arms 51–54. Arms 51 and 53 together include all the strain gages in apertures 12–27 which are exposed to compression strains when a compression load is applied between upper and lower loading surfaces 30, 31, while arms 50 and 52 together include all the strain gages in apertures 12–27 which are exposed to tension strains when a compression load is applied between upper and lower loading surfaces 30, 31.

As may be seen with recourse to FIG. 3, gages 15a, 15d face respectively upwardly and downwardly relative to vertical axis V—V while gages 15b, 15c face in opposed lateral directions that are orthogonal relative to gages 15a, 15d, and that lie along horizontal axis H—H as aforesaid. The lateral facing gages are exposed primarily or solely to compression strains (FIG. 4) while the upwardly and downwardly facing gages are exposed primarily or solely to tension strains (FIG. 4). Thus in all of apertures 12–27 the gages bearing the suffixes a, d, are tension gages while the gages bearing the suffixes b, c, are compression gages. Accordingly in the bridge arrangement shown in FIG. 5 gages having the reference numeral suffixes b, c, appear in arms 51, 53, while gages with the reference numeral suffixes a, d, appear in the arms 50, 52. Specifically, a compression sensing gage of each of apertures 12–27 is included in arm 51 and the other compression gage of each of apertures 12–27 is included in arm 53. Furthermore half the compression gages in each or arms 51 and 53 are located within their respective apertures at the b suffix position, while the other half are located at the c suffix position. The tension gages that are located in arms 50 and 51 are arranged on the same basis, i.e. a tension gage from each of apertures 12–27 appears in each of arms 50–52, and each of arms 50–52 includes half of the gages bearing an a suffix and half of the gages bearing a d suffix.

It will be noted that the bridge circuit of FIG. 9 is a series-parallel arrangement wherein half of the gages in an arm are connected in series and arranged in parallel as a group with the other half of the gages of that arm which are also connected in series. By connecting the gages into arms 51–54 in series-parallel instead of in series, gages with greater individual resistance may be selected while retaining normal bridge resistances. Thus by arranging the gages in series-parallel in each of arms 51–54 the effective total resistance of any arm can be maintained at a given value while increasing the number of strain measurement points over the number that could have been possible utilizing a simple series arrangement. It will be understood that further parallel branches may be added to arms 51–54 so as to allow further increase in the number of strain measurement points. Thus three branches, four branches, etc. may be employed as required. The net effect of such paralleling is that the load cell 10 is rendered more accurate due to the gain in number of strain sensing points thereby providing for improved averaging of strain across large areas of crosssection. Other series, parallel or series-parallel circuits could be used. Paralleling the gage resistances is further enhanced by the symmetrical placing of the gages in the arms. Moreover the arrangement of gages in apertures 12–27, reflecting two tension and two compression values for every one of the apertures, allows active positive-going arms 51, 53 and active negative-going arms 50, 52 which contributes to greater sensitivity. As aforesaid, more or less than four gages per aperture may be employed, but four gages, divided as illustrated at the vertical and horizontal axes, lend themselves to monitoring in the four-armed bridges with very good results. The overall result of the placement of the gages in their apertures and their interconnections as shown is to render a more sensitive monitoring system than has heretofore been attained.

Referring now to FIGS. 10–12, there may be seen a second embodiment of the invention. A generally disc-shaped load cell indicated generally at 60, and hereinafter termed a pancake load cell, includes a peripheral channel 61 extending completely around the outermost edge thereof at which appear eight radial apertures 62–69, which apertures correspond to apertures 12–27 of the first embodiment. The same principles apply in pancake load cells such as 60, as apply in annular load cells such as 10, i.e. the aforesaid discussion of stress concentrator apertures, and gaging some or all thereof, has equal applicability here. The radial apertures 62–69 extend inwardly toward the center of the pancake load cell 60 at which is located a centering hole 70, but are terminated short thereof. Though this has proven to be the most practical arrangement of apertures 62–69, it should be understood that modifications are contemplated. Thus, the apertures can also be extended to the center of the pancake, and can also meet there, coaxially in pairs, or otherwise. The centering hole 70 may be eliminated, if desired. Pancake load cell 60 includes an upper loading surface indicated generally at 71 and a lower loading surface indicated generally at 72. Upper and lower loading surfaces 71, 72 include annular flats 71a, 72a, respectively, upon which the load is actually borne, as was already explained with reference to flats 30c, 31c of the first embodiment. Inwardly and outwardly of flat 72a are upwardly inclined surfaces 72b, 72c respectively, which correspond to surfaces 31b, 31a of the first embodiment. Similarly inwardly and outwardly of flat 71a is disposed downwardly inclined surfaces 71b, 71c respectively, which correspond to surfaces 30b, 30a of the first embodiment. The loading surfaces 71, 72 are therefore arched upwardly and downwardly respectively, and the flats 71a, 72a lie respectively over and under an intermediate portion of each of apertures 62–67. Peripheral channel 61 is closed by a cylindrical plate 61a which extends around and is secured to the lateral periphery of the cell 60. Carried within channel 61 are cables G which constitue the collected leads from the various gages.

As is shown in FIGS. 10 and 12, strain gages are arranged in each of apertures 62–69 in a manner essentially the same as has already been described with reference to the first embodiment of FIGS. 1–4. In FIG. 12 the gages of aperture 69, which are representative, are shown. A pair of gages 69a, 69d face downwardly and upwardly respectively and are bisected by the vertical axis V—V. A pair of lateral gages 69b, 69c face laterally and are bisected by the horizontal axis H—H. As is best shown in FIG. 10, these gages extend radially inward in aperture 69 to and somewhat past the radial position of flats 71a, 72a. This has been found to be the best position for the gages in the pancake cell embodiment. The gages 69a–69d in aperture 69, and the corresponding gages in the other apertures 62–68, may be arranged in any of the fashions described in accordance with the principles already set forth in regard to the first embodiment, and may be interconnected in the same fashion into a Wheatstone bridge circuit such as that shown in FIG. 9. The gages in each of apertures 62–69 measure stress concentrations produced at the periphery of those apertures, and for the reasons already set forth with regard to the first embodiment do not measure bending stresses due to the applied loads. As may be seen in FIG. 11, annular load transferring and distributing members 80, 81 are employed upon loading surfaces 71, 72 in the same manner and for the same purposes as has already been described with reference to the embodiment of FIGS 1–5.

Employment of the annular-type load cell or the pancake-type load cell is a matter of choice, the principal distinctions residing in the desirability of one or the other construction for mechanical reasons in a given engineering situation. The cells are operated in identical fashion, and each will yield a greater repeatability at a given level of ruggedness than has heretofore been attainable in high intensity load cells of low profile.

While the two illustrative embodiments each have generally circular outer peripheries, and radial gage apertures, the invention is equally applicable to square, rectangular, or other configuration load cells, and the gaged apertures need not be radial.

The invention has been described with reference to two specific embodiments for purposes of illustration only. Those skilled in the art will readily perceive numerous changes and variations in the form and arrangement of the parts that may be practiced within the spirit and scope of the invention. All such variations and rearrangements are contemplated as being a part of the invention.

What is claimed is:

1. A load cell for weighing high intensity loads, comprising:
    (a) a body portion having an axis along which said loads are to be applied;
    (b) an arched loading surface on said body portion facing along said axis, having
        (i) a summit region located axially outwardly of the remainder of said arched loading surface, and
        (ii) a sloping region located on at least two sides of said summit region, sloping continuously axially away from said summit region;
    (c) a malleable load transferring and distributing member normally in contact with said summit region, extending laterally thereof sufficiently to overlie at least a portion of said sloping region on all sides of said summit region, having a thickness equal to a substantial fraction of the axial depth of said sloping region; and
    (d) a plurality of gaged stress concentrator apertures within said body, in a plane perpendicular to said axis.

2. A load cell for weighing high intensity loads, comprising:
    (a) a body portion having a vertical axis along which said loads are to be applied;
    (b) an upwardly arched surface on said body portion facing upwardly along said axis, for support of said load, and having
        (i) a summit region located upwardly from the remainder of said upwardly arched surface, and
        (ii) a sloping region located on at least two sides of said summit region, sloping continuously downward away from said summit region;
    (c) a downwardly arched surface on said body portion facing downwardly along said axis, for support of said load cell, and having
        (i) a foot region located downwardly from the remainder of said downwardly arched surface, and
        (ii) a sloping region located on at least two sides of said foot region, sloping continuously upward away from said foot region;
    (d) a pair of malleable load transferring and distributing members, one each normally in contact with said summit and foot regions, each extending laterally thereof respectively sufficiently to overlie and underlie respectively at least a portion of said sloping region on all sides of said summit and foot regions respectively, each having a thickness equal to a substantial fraction of the axial depth of said sloping region; and
    (e) a plurality of gaged stress concentrator apertures within said body, in a plane perpendicular to said axis, between said surfaces.

3. A load cell according to claim 2 wherein said summit and foot regions are each flat surfaces normal to said axis, and wherein said sloping regions are each inclined surfaces.

4. A load cell according to claim 2 wherein said body portion has relatively small overall dimensions in the direction of said axis, and has relatively large overall dimensions transversely of said axis.

5. A load cell for weighing high intensity loads comprising:
    (a) a body portion having relatively small overall dimensions in the direction of an axis along which said loads are to be applied and relatively large overall dimensions transversely of said axis;
    (b) an upwardly arched upper surface for support of said load, having
        (i) a flat, annular summit region located upwardly from the remainder of said upwardly arched surface, and disposed normal to said axis, and
        (ii) a sloping region located on each of the transversely inward and outward sides of said summit region, sloping continuously downward away from said summit region;
    (c) a downwardly arched lower surface for support of said load cell, having
        (i) a flat, annular foot region located downwardly from the remainder of said downwardly arched surface, and disposed normal to said axis, and (ii) a sloping region located on each of the transversely inward and outward sides of said foot region, sloping continuously downward away from said foot region;

(d) a pair of malleable load transferring and distributing members, one each normally in contact with said summit and foot regions, each extending laterally thereof respectively sufficiently overlie and underlie respectively at least a portion of said sloping region on all sides of said summit and foot regions; and (e) a plurality of gaged stress concentrator apertures within said body, in a plane perpendicular to said axis, between said surfaces.

6. A load cell according to claim 5 wherein, said sloping regions on each of said upper and lower surfaces are inclined surfaces.

7. A load cell according to claim 5 wherein, said load transferring and distributing members are essentially planar prior to application of said load to said load cell.

8. A load cell according to claim 7 wherein, said load transferring and distributing members each are fabricated in copper metal.

9. A load cell according to claim 5 wherein, the periphery of said load cell is generally circular, and said plurality of gaged stress concentrator apertures extend radially toward the center of that generally circular outline.

10. A load cell according to claim 9 wherein, said radial stress concentrator apertures are spaced at equal angles around said load cell.

11. A load cell according to claim 10 wherein, said radial stress concentrator apertures extend radially inward from said generally circular transverse periphery of said load cell.

12. A load cell according to claim 5 wherein, in addition to said gaged stress concentrator apertures, is included a plurality of ungaged stress concentrator apertures.

13. A load cell according to claim 12 wherein, all of said stress concentrator apertures are radially oriented, extend inwardly from the transverse periphery of said load cell, and are spaced at equal angles therearound.

14. A load cell according to claim 13 wherein, said ungaged apertures are symmetrically dispersed among said gaged apertures.

15. A load cell according to claim 5 wherein, gages are distributed in said gaged apertures so that an average stress value of at least one sign is monitored.

16. A load cell according to claim 15 wherein, every gaged aperture has at least one tension gage and one compression gage bonded to the inner circumference thereof.

17. A a load cell according to claim 5 wherein, said body is generally annular in cross-section.

18. A load cell according to claim 5 wherein, said body is generally disc-shaped in cross-section.

19. A load cell for weighing heavy loads, comprising:
(a) a body portion having an axis along which said loads are to be applied;
(b) said body having a plurality of stress concentrator apertures in a plane perpendicular to said axis;
(c) strain gage means attached to said body and within at least some of said apertures, for measuring said loads;
wherein the improvement comprises:
(d) a loading surface on said body including:
(1) an elongated plane portion at right angles to said axis;
(2) two elongated sloping portions tapering away from said plane portion on each of the long sides thereof, said plane portion and said sloping portions being adapted to engage an opposing load applying member having a flat surface wider than said plane portion, so that compression of the body due to application of load to said loading surface is effective to bring elongated areas of said slopping portions into contact with said load applying member, and the total load carrying area of said loading surface increases with increasing load.

20. A load cell as defined in claim 19, including:
(a) a load transferring and distributing member for transferring force to said loading surface, said member being of malleable material and abutting said plane portion when the body portion is unstressed, and extending in alignment with said sloping portions and adapted to engage the same when the body is compressed by a load.

21. A load cell as defined in claim 19, in which said sloping portions make an angle greater than 178° with said plane portion.

References Cited

UNITED STATES PATENTS

| 2,276,843 | 3/1942 | Hathaway | 73—141 |
| 3,277,704 | 10/1966 | Eckard | 73—141 |

FOREIGN PATENTS

| 216,248 | 7/1961 | Austria. |
| 739,278 | 10/1955 | Great Britain. |

RICHARD C. QUEISSER, Primary Examiner.

C. A. RUEHL, Assistant Examiner.

U.S. Cl. X.R.

177—211